US010645451B2

(12) United States Patent
Hao et al.

(10) Patent No.: US 10,645,451 B2
(45) Date of Patent: May 5, 2020

(54) RESOURCE MANAGEMENT FOR VIDEO STREAMING WITH INATTENTIVE USER

(71) Applicant: AT&T Intellectual Property I, L.P., Atlanta, GA (US)

(72) Inventors: Shuai Hao, Hillsborough, NJ (US); Bo Han, Bridgewater, NJ (US); Moo-Ryong Ra, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/238,129

(22) Filed: Jan. 2, 2019

(65) Prior Publication Data

US 2019/0174186 A1    Jun. 6, 2019

Related U.S. Application Data

(63) Continuation of application No. 15/830,631, filed on Dec. 4, 2017, now Pat. No. 10,200,753.

(51) Int. Cl.
*H04N 21/442* (2011.01)
*H04L 29/06* (2006.01)
(Continued)

(52) U.S. Cl.
CPC ... *H04N 21/44218* (2013.01); *G06K 9/00288* (2013.01); *G06K 9/00597* (2013.01);
(Continued)

(58) Field of Classification Search
CPC combination set(s) only.
See application file for complete search history.

(56) References Cited

U.S. PATENT DOCUMENTS 7,284,201 B2   10/2007   Cohen-Solal
7,857,452 B2   12/2010   Martinez-Conde et al.
(Continued)

FOREIGN PATENT DOCUMENTS

EP    1843592 A1     10/2007
WO    2017152215 A1   9/2017

OTHER PUBLICATIONS

Patil, Shruti et al., "Gazetube: Gaze-Based Adaptive Video Playback for Bandwidth and Power Optimizations", Global Communications Conference (GLOBECOM), IEEE, 2015, 6 pages.

*Primary Examiner* — Alexander Gee
(74) *Attorney, Agent, or Firm* — Guntin & Gust, PLC; Jay H. Anderson (57) ABSTRACT

Aspects of the subject disclosure may include, for example, a method including detecting attention by a user to a presentation displayed at an audiovisual presentation device. A real-time image of the user is obtained and stored local to the audiovisual presentation device. The image is analyzed to determine a presence in the image of a facial feature of the user; the device determines, based on the presence of the facial feature, whether the user is attentive to the presentation. When the user is not attentive to the presentation, a procedure is initiated at the audiovisual presentation device to reduce resource consumption by the device; the procedure can include continuing the presentation at a video quality level lower than at the beginning of the presentation, reducing a brightness of the display, continuing the presentation with only the audio portion, and discontinuing the presentation. Other embodiments are disclosed.

20 Claims, 8 Drawing Sheets

(51) Int. Cl.
  *G06K 9/00* (2006.01)
  *H04N 21/462* (2011.01)
  *H04M 1/725* (2006.01)

(52) U.S. Cl.
  CPC ...... *H04L 65/1016* (2013.01); *H04L 65/1089* (2013.01); *H04L 65/4084* (2013.01); *H04L 65/602* (2013.01); *H04N 21/4621* (2013.01); *H04L 65/4069* (2013.01); *H04L 65/601* (2013.01); *H04M 1/72569* (2013.01)

(56) References Cited

U.S. PATENT DOCUMENTS

| | | | |
|---|---|---|---|
| 7,975,283 B2 | 7/2011 | Bedingfield, Sr. et al. | |
| 8,128,230 B2 | 3/2012 | Zuccolotto et al. | |
| 8,990,843 B2 | 3/2015 | Kwan et al. | |
| 9,071,727 B2 | 6/2015 | Chou | |
| 9,094,539 B1 | 7/2015 | Noble et al. | |
| 9,239,615 B2 | 1/2016 | Thieberger et al. | |
| 9,477,993 B2 | 10/2016 | Thieberger et al. | |
| 9,525,912 B1* | 12/2016 | Israelian | G06F 16/245 |
| 9,554,085 B2 | 1/2017 | Garg et al. | |
| 9,569,734 B2 | 2/2017 | Thieberger | |
| 2007/0078552 A1 | 4/2007 | Rosenberg et al. | |
| 2007/0162922 A1 | 7/2007 | Park et al. | |
| 2010/0295839 A1 | 11/2010 | Nagaya et al. | |
| 2010/0299689 A1* | 11/2010 | Mears | G06Q 30/02 725/9 |
| 2014/0007148 A1 | 1/2014 | Ratliff et al. | |
| 2014/0020003 A1 | 1/2014 | Alshinnawi et al. | |
| 2014/0204016 A1 | 7/2014 | Plowman et al. | |
| 2014/0208145 A1 | 7/2014 | Piccolotto et al. | |
| 2014/0344017 A1* | 11/2014 | Deephanphongs | H04N 21/25866 705/7.29 |
| 2014/0347363 A1 | 11/2014 | Kaburlasos | |
| 2015/0169053 A1* | 6/2015 | Bozarth | G06K 9/00604 345/156 |
| 2015/0341411 A1* | 11/2015 | Huber | H04L 65/4092 709/231 |
| 2016/0007047 A1 | 1/2016 | Hosseini | |
| 2016/0225122 A1* | 8/2016 | Boelter | H04N 21/42201 |
| 2016/0262614 A1 | 9/2016 | Ninomiya et al. | |

\* cited by examiner

RESOURCE MANAGEMENT FOR VIDEO STREAMING WITH INATTENTIVE USER

CROSS-REFERENCE TO RELATED APPLICATIONS

This application is a continuation of U.S. application Ser. No. 15/830,631, filed Dec. 4, 2017, which is incorporated herein by reference in its entirety.

FIELD OF THE DISCLOSURE

The subject disclosure relates to video streaming services, and more particularly to a system for managing resource usage at a user device when the user is not paying attention to a video presentation on the device.

BACKGROUND

Streaming video to user devices (particularly mobile devices) has become popular. However, a user can become distracted while viewing a streaming video presentation.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for detecting whether a user of an audiovisual presentation device is paying attention to a presentation at the device, and if not, performing a staged reduction of resource consumption at the device. Other embodiments are described in the subject disclosure.

One or more aspects of the subject disclosure include a method comprising detecting, by a processing system including a processor of an audiovisual presentation device, attention by a user to a presentation of content at a display of the audiovisual presentation device; the content includes an audio portion and a video portion and the presentation is initiated at a first video quality level. The detecting includes obtaining a real-time image of the user; storing the image in a data storage local to the audiovisual presentation device; performing an analysis of the image; determining, based on the analysis, a presence in the image of a predefined facial feature of the user; determining, based on the presence of the predefined facial feature, whether the user is attentive to the presentation; and deleting the image from the data storage after the analysis. The method also includes initiating, responsive to the user not being attentive to the presentation, a first procedure at the audiovisual presentation device to reduce resource consumption by the audiovisual presentation device; the first procedure includes one or more of continuing the presentation at a second video quality level lower than the first video quality level, reducing a brightness of the display, continuing the presentation with only the audio portion, and discontinuing the presentation.

One or more aspects of the subject disclosure include a device comprising a processing system including a processor and a memory that stores executable instructions; the instructions, when executed by the processing system, facilitate performance of operations. The operations comprise detecting attention by a user to a presentation of content at a display of an audiovisual presentation device; the content includes an audio portion and a video portion, and the presentation is initiated at a first video quality level. The detecting comprises obtaining a real-time image of the user; storing the image in a data storage local to the audiovisual presentation device; performing an analysis of the image, the analysis comprising an eye detection procedure; determining, based on the analysis, a presence in the image of a predefined facial feature of the user; determining, based on the presence of the predefined facial feature, whether the user is attentive to the presentation; and deleting the image from the data storage after the analysis. The operations also comprise initiating, responsive to the user not being attentive to the presentation, a first procedure at the audiovisual presentation device to reduce resource consumption by the audiovisual presentation device. The detecting is performed at predetermined time intervals during the presentation, and the first procedure comprises one or more of continuing the presentation at a second video quality level lower than the first video quality level; reducing a brightness of the display; continuing the presentation with only the audio portion; and discontinuing the presentation.

One or more aspects of the subject disclosure include a non-transitory machine-readable medium comprising executable instructions that, when executed by a processing system including a processor, facilitate performance of operations. The operations comprise detecting attention by a user to a presentation of content at a display of an audiovisual presentation device; the content includes an audio portion and a video portion, and the presentation is initiated at a first video quality level. The detecting comprises obtaining a real-time image of the user; storing the image in a data storage local to the audiovisual presentation device; performing an analysis of the image; determining, based on the analysis, a presence in the image of a predefined facial feature of the user; determining, based on the presence of the predefined facial feature, whether the user is attentive to the presentation, where the user is determined to not be attentive to the presentation responsive to the predefined facial feature not being present in the image over a plurality of time intervals; and deleting the image from the data storage after the analysis. The operations further comprise initiating, responsive to the user not being attentive to the presentation, a first procedure at the audiovisual presentation device to reduce resource consumption by the audiovisual presentation device; the first procedure includes one or more of continuing the presentation at a second video quality level lower than the first video quality level, reducing a brightness of the display, continuing the presentation with only the audio portion, and discontinuing the presentation.

Figure 1:
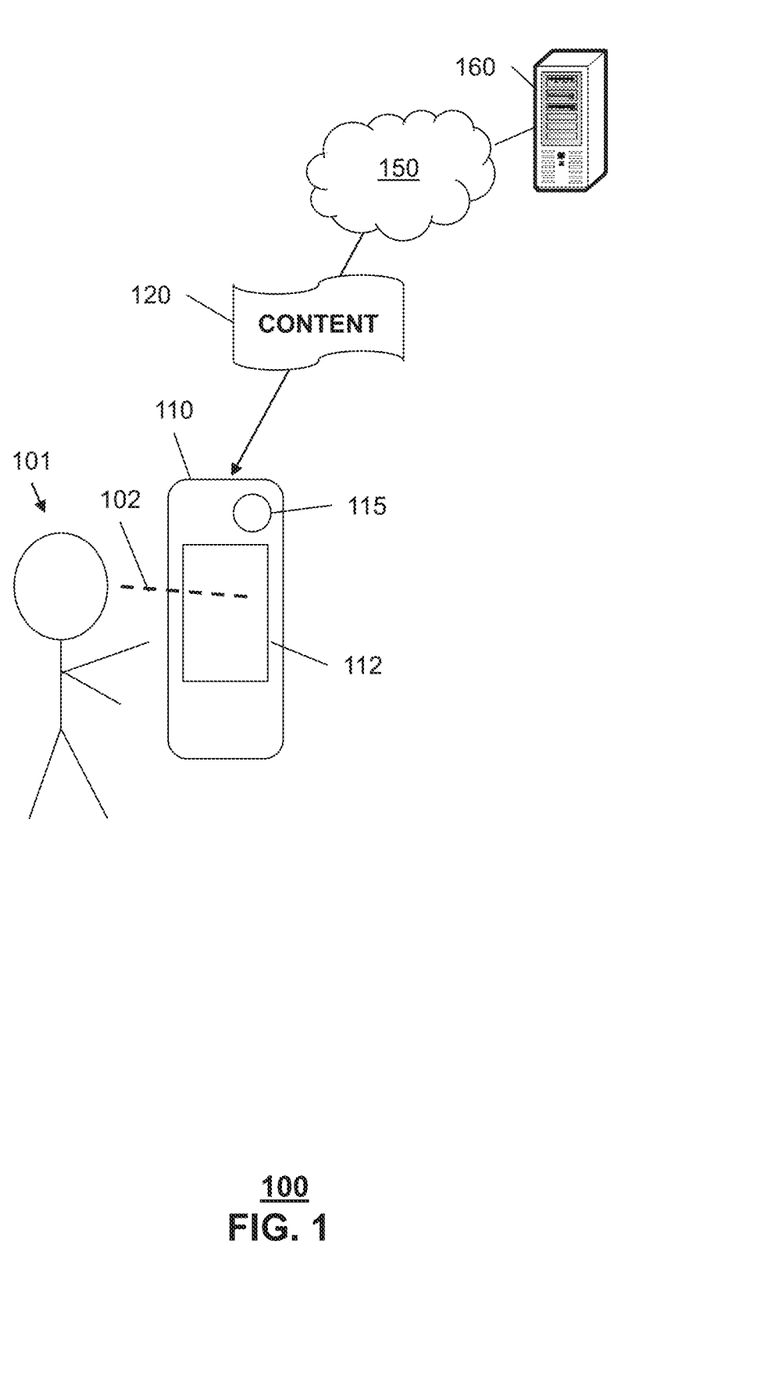
FIG. 1 schematically illustrates presentation of content at a user device, in accordance with embodiments of the disclosure.

FIG. 1 schematically illustrates an embodiment 100 of the disclosure, in which a user 101 of user device 110 obtains audio/video content 120 for presentation at the device. In this embodiment, the user subscribes to a service provider network 150 which delivers the content from a content provider system including a content server 160.

The user device 110 includes a display screen 112 and a camera 115. As shown schematically in FIG. 1, the user's line of sight 102 is generally directed at the display screen 112 while the user is attentively viewing the video presentation. Accordingly, the user's eyes are within the field of view of the camera 115.

Figure 2:
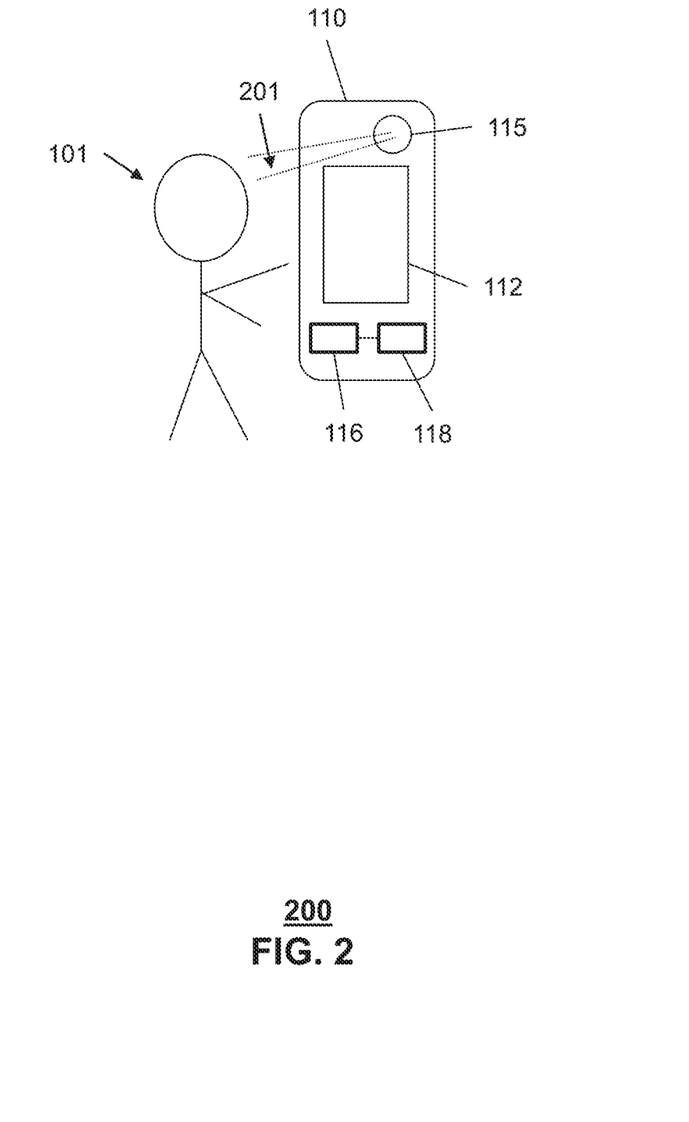
FIG. 2 schematically illustrates detecting whether a user is paying attention to the presentation at the user device, in accordance with embodiments of the disclosure.

FIG. 2 schematically illustrates a procedure 200 for detecting whether the user is paying attention to the video presentation, in accordance with embodiments of the disclosure. At the beginning of the video presentation and at intervals thereafter, the camera 115 automatically acquires an image 201 of the user's face, including the user's eyes. The image is then stored in a storage medium 116 local to the device, and analyzed by a processor 118 local to the device and coupled to storage 116.

The processor 118 executes a detection algorithm using the image 201 as input. In this embodiment, the algorithm can detect whether the user's eyes are in the image; if so, the algorithm determines that the user is paying attention to the presentation at the display 112. If the user's eyes are not detected, the algorithm determines that the user is not paying attention to the display.

It will be appreciated that the procedures for acquiring, storing and analyzing the image are performed locally at the user device, and thus do not require use of network resources. In this embodiment, the image is deleted from the storage 116 after being analyzed; only one user image is stored at a time, and then only while required for the detection procedure, thereby conserving device resources and protecting user privacy.

The time interval for acquiring and analyzing the image can be a device setting, either predefined or adjustable by the user. The time interval can be constant throughout the presentation, or vary during the presentation. In an embodiment, the interval is longest at the beginning of the presentation (when the user is more likely to be paying attention), and becomes progressively shorter (not necessarily in a linear fashion) during the presentation.

Alternatively, the time interval can be prescribed in metadata accompanying the content 120. In this embodiment, the interval can vary with the current portion of the content, depending on the network resources required to deliver that content. For example, during a scene involving only two characters engaging in dialogue, the user's attention may be assessed less frequently (i.e. with a longer time interval), while during an action scene (e.g. combat, car chase, explosion) requiring greater network resources, the user's attention may be more closely monitored (i.e. with a shorter time interval).

In another embodiment, a schedule for assessing user attention, during presentation of a specific item of content, can be preloaded in storage 116, either when the user requests download of that content or at an earlier time.

In the foregoing embodiments, the time interval for assessing the user's attention depends either on a device setting or on the item of content, and thus is independent of network conditions. In another embodiment, a message specifying a time interval can be sent to the user device via the network to optimize network resource usage; for example, the service provider can require a shorter time interval during a period of increased bandwidth usage. In this embodiment, the specified time interval can depend on a subscription level of the user; for example, a user with a "Platinum Level" subscription can have his attention monitored less closely than a user with a "Bronze Level" subscription. In another embodiment, the user can select (and communicate to the network service provider) acceptance of a shorter time interval, in exchange for a discounted subscription rate and/or a discounted price for downloading the item of content.

Figure 3:
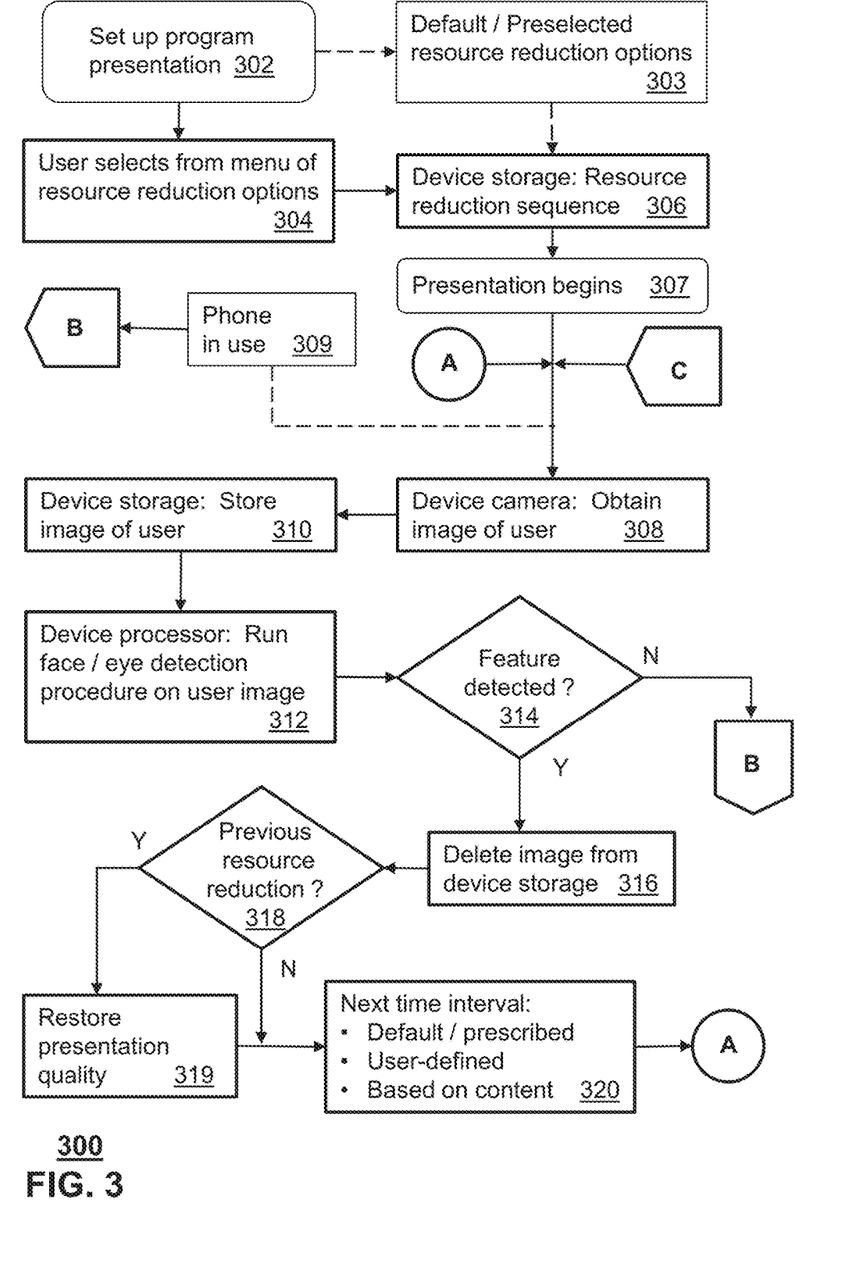
FIGS. 3-4 are connected flowcharts depicting an illustrative embodiment of a method for managing resources at the user device of FIGS. 1-2, in accordance with embodiments of the disclosure.

FIG. 3 is a flowchart depicting a method 300 for detecting user attention at the user device of FIGS. 1-2, in accordance with embodiments of the disclosure. In these embodiments, a procedure is invoked for reducing resource usage at the user device if the user is determined to be not paying attention to an audiovisual presentation on the device.

In step 302, streaming an item of content at the user device is ready to begin. The user is presented with a menu of resource reduction options and makes selection(s) from those options (step 304). Alternatively (step 303), the resource reduction options can be preselected (e.g. by previous user selections) or established by default (e.g. predefined device settings). The resource reductions to be applied, and the sequence for applying them, are stored in device storage 116 (step 306).

The presentation of the content then begins (step 307). In an embodiment, if the processor 118 detects any additional device usage during the presentation, such as use of the mobile phone (step 309), the user is immediately assumed to be not paying attention to the presentation.

At the beginning of the presentation, the device camera 115 obtains an image of the user (step 308); the image is stored in the device storage 116 (step 310) and then analyzed (step 312) to detect a feature of the user; for example, an eye-detection algorithm determines whether the user's eyes appear in the image. If the result is negative (that is, the user's eyes are not detected in the image), the resource reduction procedure is invoked (step 314). In an embodiment, the resource reduction procedure is invoked only after a specified number of negative results (e.g. three negative results in the last five intervals, and/or three consecutive negative results).

The image is deleted from storage 116 (step 316) after the user is determined to be paying attention. If a resource reduction is already in place (step 318), the presentation can be restored to its original quality; alternatively, one or more resource reductions can be removed in a specified sequence (step 319). For example, if after an interval the user is again paying attention, a previously dimmed display screen 112 can be restored to its usual brightness; if the user is determined to be paying attention for a specified number of intervals thereafter, the presentation can continue with its video quality restored to its original level. In an embodiment, the restorations of presentation quality can be applied in a user-defined sequence; alternatively, this sequence can be a default according to a device setting. A new time interval then begins (step 320), and a new assessment of user attention is made at the end of that interval.

Figure 4:
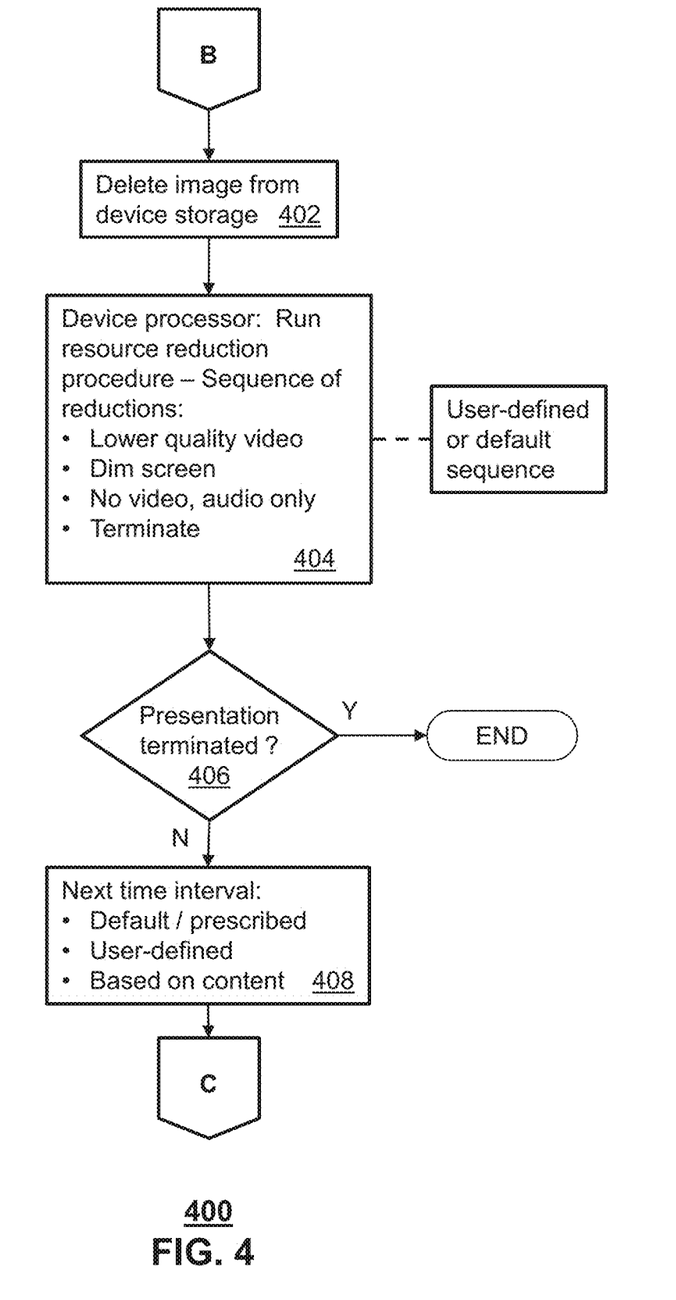

FIG. 4 is a flowchart depicting a method 400 for applying resource reductions at the user device of FIGS. 1-2, in accordance with embodiments of the disclosure. In these embodiments, resource usage is reduced in stages if the user is determined to be not paying attention to an audiovisual presentation on the device.

Once a determination of user inattention is made, the user image is deleted from storage 116 (step 402). A resource reduction procedure is then performed (step 404); the action taken can depend on which (if any) resource reductions have already been made. For example, the first resource reduction can include reducing the quality of the video (e.g. by streaming at a lower bitrate). If the user still is not paying attention at the next interval (or after a specified number of intervals), a second resource reduction can include dimming the presentation screen. A third resource reduction can include turning off the display, so that the presentation continues with its audio portion only. As a final resource reduction, the device processor can cause the presentation to be terminated.

It will be appreciated that a variety of resource reductions can be applied, and that resource reductions can be applied in a variety of sequences. For example, in a user device where device power is a primary concern, the first resource reduction can be dimming the device screen.

If the presentation is still to continue (step 406), a new time interval begins (step 408), and a new assessment of user attention is made at the end of that interval.

In the foregoing embodiments, the resource reductions and their application sequence are specified at the beginning of the presentation; application of a particular resource reduction depends on the assessment of the user's attention (in the current interval and/or past intervals), and thus is independent of network conditions. In another embodiment, a message specifying a resource reduction can be sent to the user device to optimize network resource usage; for example, the service provider can require a reduced bitrate if the user has not paid attention for a certain number of intervals. In an embodiment, the resource reductions can be in accordance with a user's subscription level; for example, a "Platinum Level" subscriber can specify that the bitrate should not be reduced, or that the display screen should not be dimmed until the video is turned off entirely.

While for purposes of simplicity of explanation, the respective processes are shown and described as a series of blocks in FIGS. 3-4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
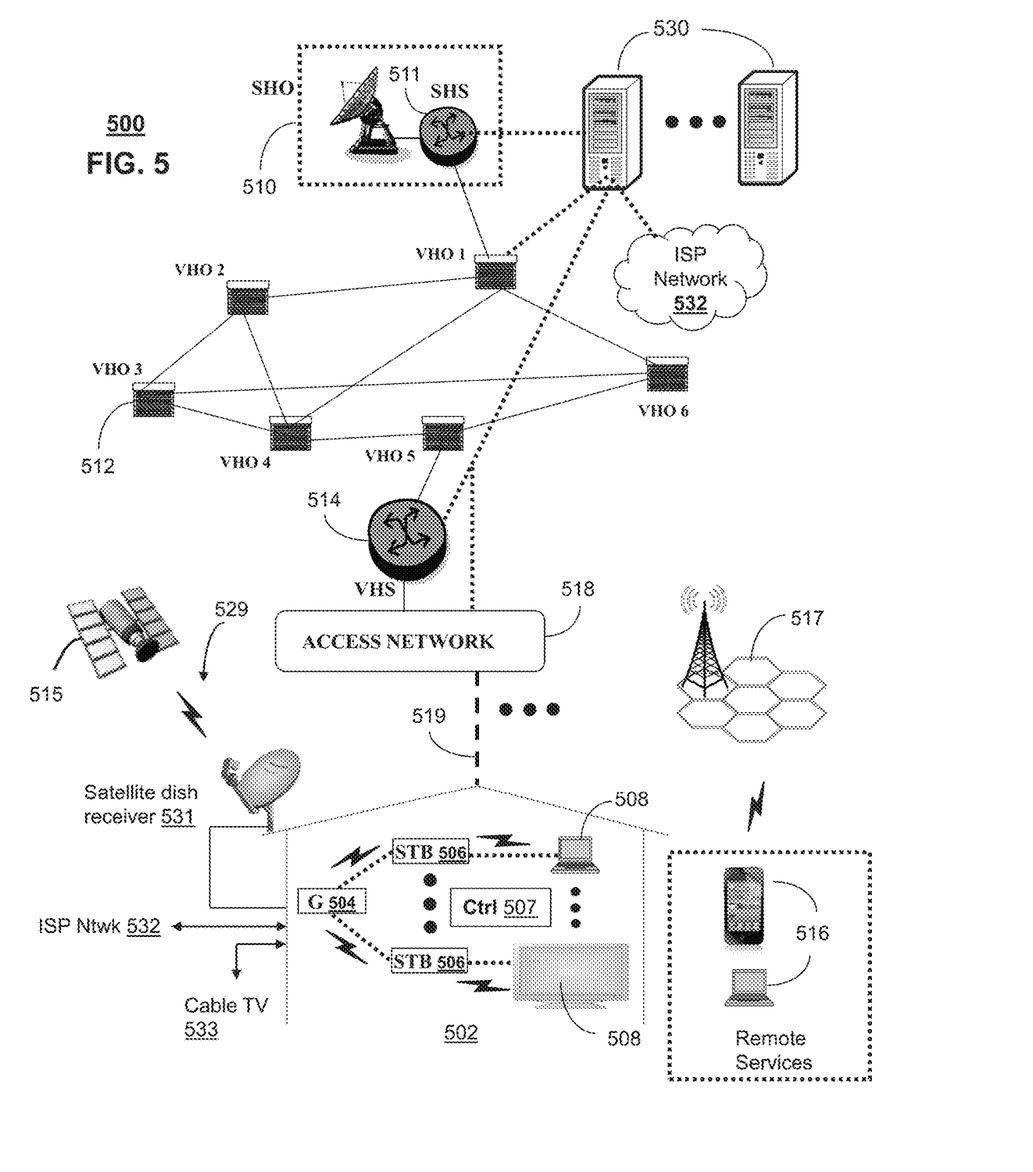
FIGS. 5-6 depict illustrative embodiments of communication systems that provide media services to the user devices of FIGS. 1-2.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with the devices of FIGS. 1 and/or 2 as another representative embodiment of communication system 500. For instance, one or more devices illustrated in the communication system 500 of FIG. 5 can include a processing system including a processor and a memory that stores executable instructions; the instructions, when executed by the processing system, facilitate performance of operations. The operations can comprise detecting attention by a user to a presentation of content at a display of an audiovisual presentation device, where the content includes an audio portion and a video portion, and the presentation is initiated at a first video quality level. The detecting can comprise obtaining a real-time image of the user; storing the image in a data storage local to the audiovisual presentation device; performing an analysis of the image, the analysis comprising an eye detection procedure; determining, based on the analysis, a presence in the image of a predefined facial feature of the user; determining, based on the presence of the predefined facial feature, whether the user is attentive to the presentation; and deleting the image from the data storage after the analysis. The operations can also comprise initiating, responsive to the user not being attentive to the presentation, a first procedure at the audiovisual presentation device to reduce resource consumption by the audiovisual presentation device. The detecting can be performed at predetermined time intervals during the presentation; the first procedure can comprise one or more of continuing the presentation at a second video quality level lower than the first video quality level; reducing a brightness of the display; continuing the presentation with only the audio portion; and discontinuing the presentation.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a server (herein referred to as server 530). The server 530 can use computing and communication technology to deliver content to user devices. For instance, functions of server 530 can be similar to the functions described for server 160 of FIG. 1. The media processors 506 and wireless communication devices 516 can be provisioned with software functions to utilize the services of server 530. For instance, functions of media processors 506 and wireless communication devices 516 can be similar to the functions described for device 101 of FIGS. 1-2 in accordance with methods 300-400.

Figure 6:
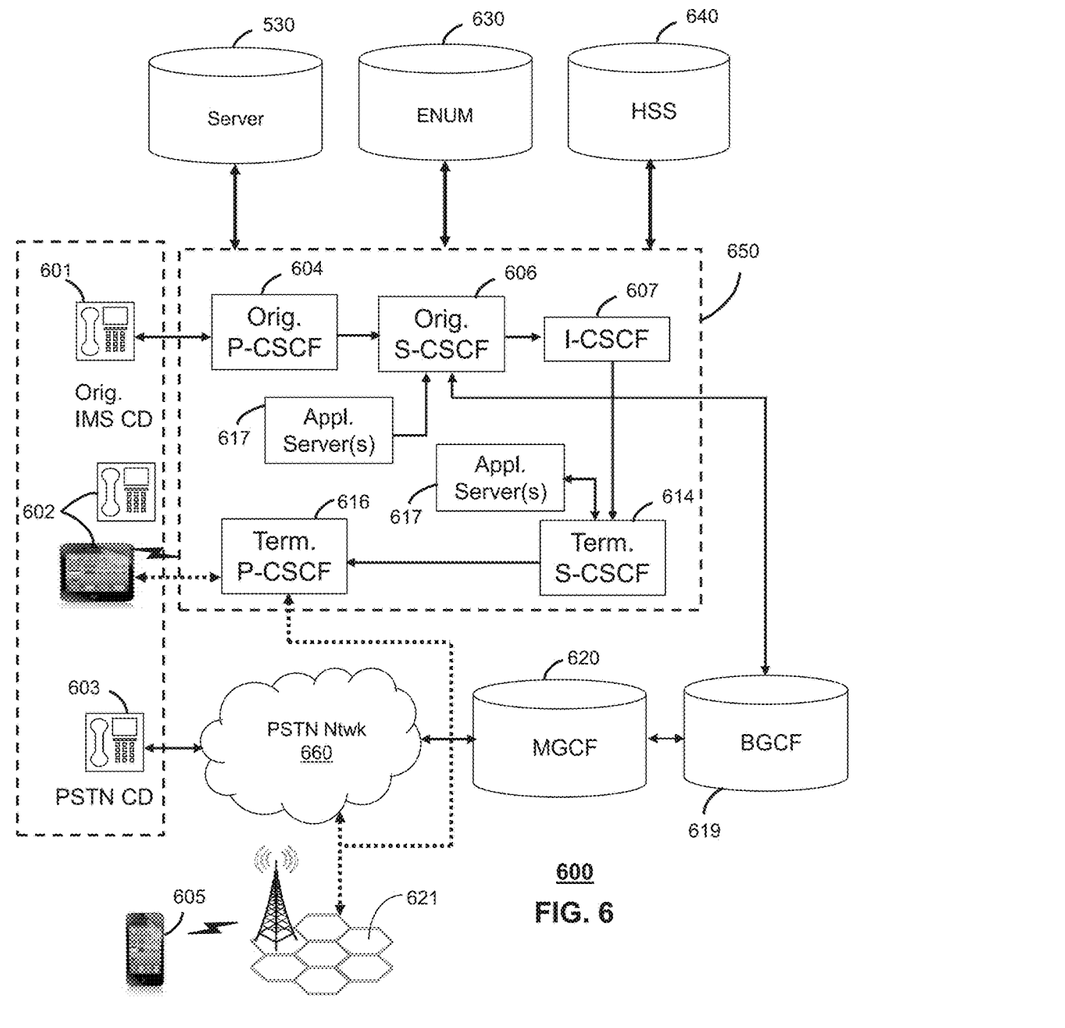

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with devices of FIGS. 1 and/or 2 and communication system 500 as another representative embodiment of communication system 500. In particular, the communication system can perform a method that includes detecting, by a processing system including a processor of an audiovisual presentation device, attention by a user to a presentation of content at a display of the audiovisual presentation device; the content can include an audio portion and a video portion, and the presentation can be initiated at a first video quality level. The detecting can include obtaining a real-time image of the user; storing the image in a data storage local to the audiovisual presentation device; performing an analysis of the image; determining, based on the analysis, a presence in the image of a predefined facial feature of the user; determining, based on the presence of the predefined facial feature, whether the user is attentive to the presentation; and deleting the image from the data storage after the analysis.

The method can also include initiating, responsive to the user not being attentive to the presentation, a first procedure at the audiovisual presentation device to reduce resource consumption by the audiovisual presentation device; the first procedure can include one or more of continuing the presentation at a second video quality level lower than the first video quality level, reducing a brightness of the display, continuing the presentation with only the audio portion, and discontinuing the presentation.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 530 of FIG. 5 can be operably coupled to communication system 600 for purposes similar to those described above. Server 530 can provide services to the CDs 601, 602, 603 and 605 of FIG. 6, which can be adapted with software to utilize the services of the server 530 and perform functions similar to the functions described for communication device 101 of FIGS. 1-2 in accordance with methods 300-400 of FIGS. 3-4. Server 530 can be an integral part of the application server(s) 617, which can be adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
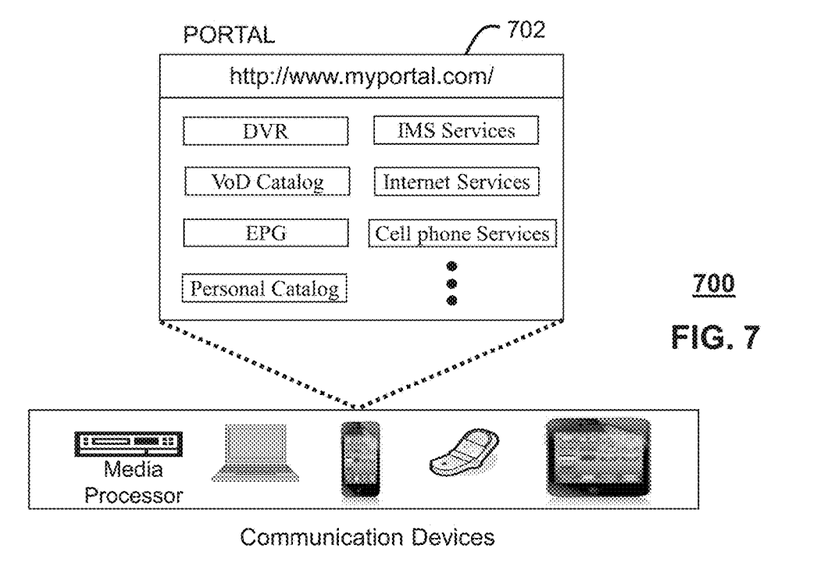
FIG. 7 depicts an illustrative embodiment of a web portal for interacting with the communication systems of FIGS. 1-2 and 5-6.

FIG. 7 depicts an illustrative embodiment of a web portal 702 of a communication system 700. Communication system 700 can be overlaid or operably coupled with the devices of FIGS. 1 and/or 2, communication system 500, and/or communication system 600 as another representative embodiment of the devices of FIGS. 1 and/or 2, communication system 500, and/or communication system 600. The web portal 702 can be used for managing services of the devices of FIGS. 1 and/or 2 and communication systems 500-600. A web page of the web portal 702 can be accessed by a Uniform Resource Locator (URL) with an Internet browser using an Internet-capable communication device such as those described in FIGS. 1 and/or 2 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications to adapt these applications as may be desired by subscribers and/or service providers of devices of FIGS. 1 and/or 2, and communication systems 500-600.

Figure 8:
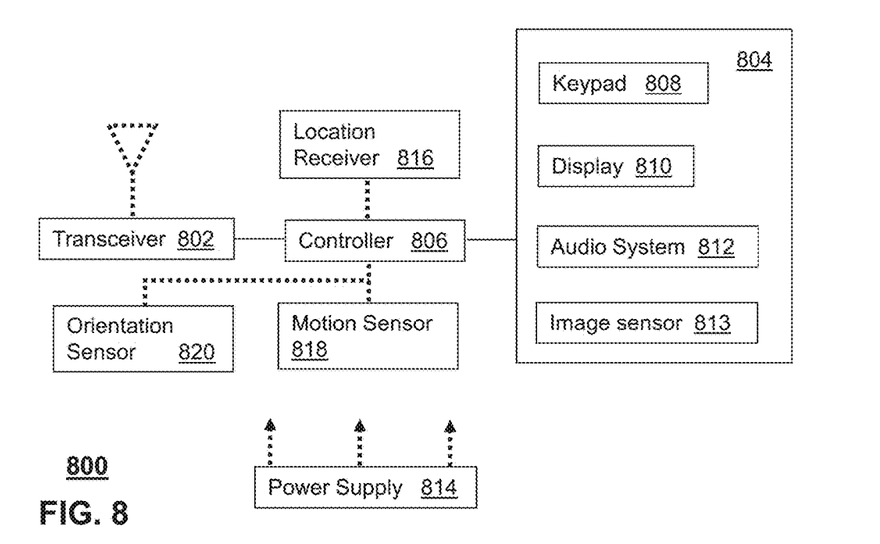
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1 and/or 2 and FIGS. 5-6, and can be configured to perform portions of methods 300-400 of FIGS. 3-4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1 and/or 2, the media processor 506, the media devices 508, or the portable communication devices 516 of FIG. 5, as well as the IMS CDs 601-502 and PSTN CDs 603-505 of FIG. 6. It will be appreciated that the communication device 800 can also represent other devices that can operate in, communication systems 500-600 of FIGS. 5-6 such as a gaming console and a media player.

Upon reviewing the aforementioned embodiments, it would be evident to an artisan with ordinary skill in the art that said embodiments can be modified, reduced, or enhanced without departing from the scope of the claims described below. For example, an attention management system can include device 101 and additional devices for engaging and/or alerting the user to pay attention to a presentation, using methods including methods 300-400. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
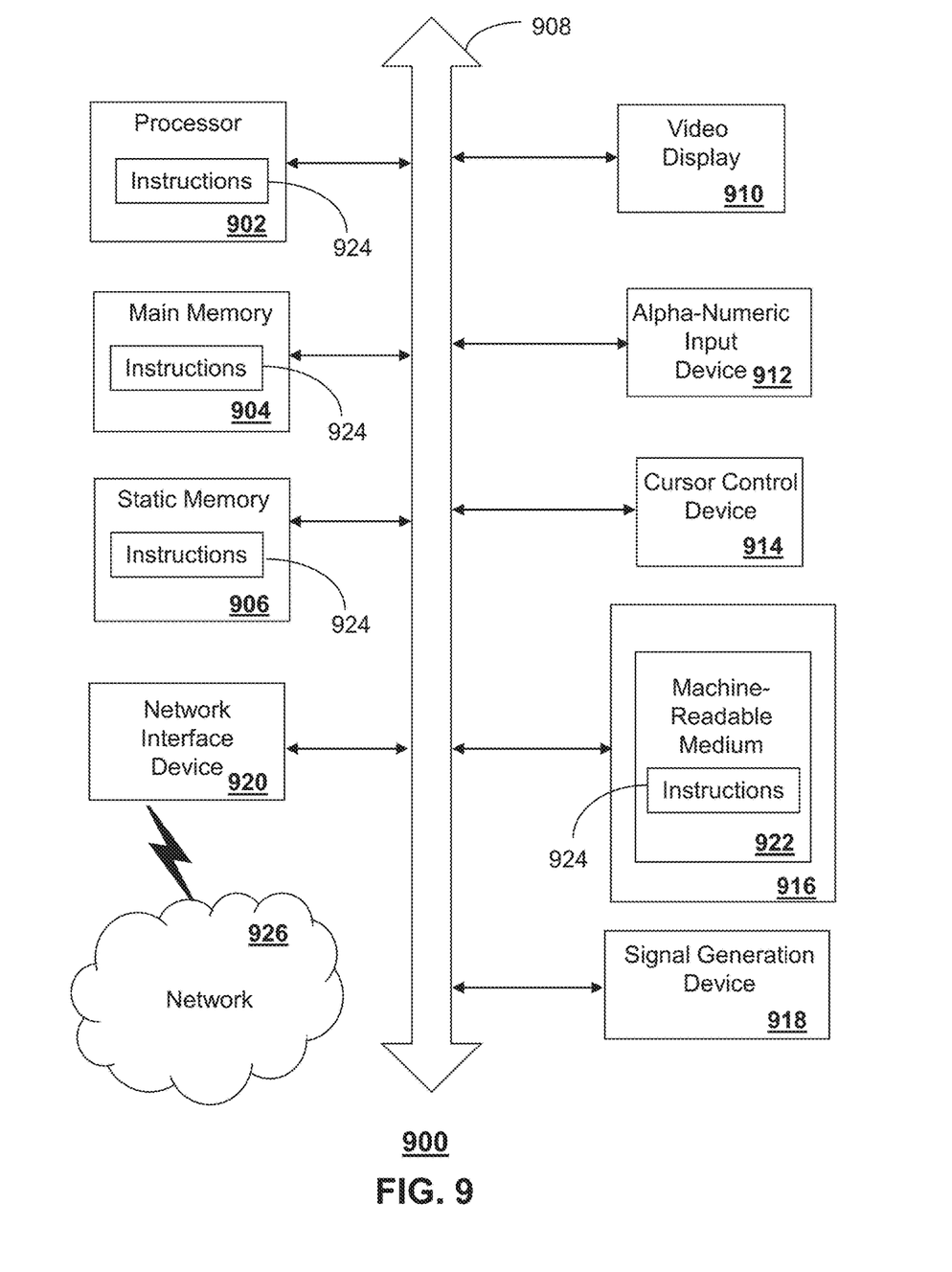
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the server 530, the media processor 506 and other devices of FIGS. 1-2 and 5-8. In particular, one or more instances of the machine can operate as an audiovisual presentation device as shown in FIGS. 1-2. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   determining, by a processing system including a processor of an audiovisual presentation device, attentiveness of a user to a presentation of content at a display of the audiovisual presentation device, wherein the presentation begins at an initial video quality level and with an initial brightness of the display, wherein the determining is performed at intervals during the presentation, and wherein the intervals are varied during presentation of the content in accordance with a level of resources required to deliver a current portion of the content;
   responsive to a determination that the user is not attentive to the presentation, initiating, by the processing system, a first procedure at the audiovisual presentation device to reduce resource consumption by the audiovisual presentation device; and
   subsequent to the first procedure and responsive to a determination that the user is attentive to the presentation, initiating, by the processing system, a second procedure at the audiovisual presentation device to restore resource consumption by the audiovisual presentation device,
      wherein the second procedure comprises one or more of:
         continuing the presentation at the initial video quality level, and continuing the presentation with the initial brightness of the display.

2. The method of claim 1, wherein the determining the attentiveness of the user is based on a presence of a predefined facial feature of the user in a real-time image of the user.

3. The method of claim 2, wherein the second procedure is initiated responsive to the predefined facial feature being present in the image over a specified number of consecutive intervals.

4. The method of claim 2, wherein the determining the attentiveness of the user comprises storing the image in a data storage local to the audiovisual presentation device, and further comprising deleting, by the processing system, the image from the data storage after the determining is performed.

5. The method of claim 1, wherein the content includes an audio portion and a video portion, and wherein the first procedure comprises one or more of continuing the presentation at a reduced video quality level lower than the initial video quality level, reducing the brightness of the display, continuing the presentation with only the audio portion, and discontinuing the presentation.

6. The method of claim 1, wherein the first procedure comprises a plurality of reductions of resources performed in a specified sequence, and wherein the second procedure comprises a corresponding plurality of restorations of the resources performed in a reverse of the specified sequence.

7. The method of claim 6, wherein the sequence is specified in accordance with user input via the audiovisual presentation device.

8. The method of claim 1, wherein the second procedure is initiated at a predetermined time interval subsequent to the determination that the user is attentive to the presentation.

9. The method of claim 1, wherein the content is delivered to the audiovisual presentation device over a network, and wherein the intervals are decreased in accordance with an increase in a level of network resources required to deliver the current portion of the content.

10. The method of claim 1, wherein the intervals are specified in metadata accompanying the content.

11. A device, comprising:
a processing system including a processor; and
a memory that stores executable instructions that, when executed by the processing system, facilitate performance of operations comprising:
determining attentiveness of a user to a presentation of content at a display of an audiovisual presentation device, wherein the content is delivered to the audiovisual presentation device over a network, wherein the presentation begins at an initial video quality level and with an initial brightness of the display, wherein the determining is performed at intervals during the presentation, and wherein the intervals are varied during presentation of the content in accordance with a level of resources required to deliver a current portion of the content;
responsive to a determination that the user is not attentive to the presentation, initiating a first procedure at the audiovisual presentation device to reduce resource consumption by the audiovisual presentation device; and
subsequent to the first procedure and responsive to a determination that the user is attentive to the presentation, initiating a second procedure at the audiovisual presentation device to restore resource consumption by the audiovisual presentation device,
wherein the second procedure comprises one or more of:
continuing the presentation at the initial video quality level, and
continuing the presentation with the initial brightness of the display.

12. The device of claim 11, wherein the determining the attentiveness of the user is based on a presence of a predefined facial feature of the user in a real-time image of the user.

13. The device of claim 11, wherein the content includes an audio portion and a video portion, and wherein the first procedure comprises one or more of continuing the presentation at a reduced video quality level lower than the initial video quality level, reducing the brightness of the display, continuing the presentation with only the audio portion, and discontinuing the presentation.

14. The device of claim 11, wherein the first procedure comprises a plurality of reductions of resources performed in a specified sequence, and wherein the second procedure comprises a corresponding plurality of restorations of the resources performed in a reverse of the specified sequence.

15. The device of claim 11, wherein the second procedure is initiated at a predetermined time interval subsequent to the determination that the user is attentive to the presentation.

16. A machine-readable medium comprising executable instructions that, when executed by a processing system including a processor, facilitate performance of operations comprising:
determining attentiveness of a user to a presentation of content at a display of an audiovisual presentation device, based on a presence of a predefined facial feature of the user in a real-time image of the user, wherein the content is delivered to the audiovisual presentation device over a network, wherein the presentation begins at an initial video quality level and with an initial brightness of the display, wherein the determining is performed at intervals during the presentation, and wherein the intervals are varied during presentation of the content in accordance with a level of resources required to deliver a current portion of the content;
responsive to a determination that the user is not attentive to the presentation, initiating a first procedure at the audiovisual presentation device to reduce resource consumption by the audiovisual presentation device; and
subsequent to the first procedure and responsive to a determination that the user is attentive to the presentation, initiating a second procedure at the audiovisual presentation device to restore resource consumption by the audiovisual presentation device,
wherein the second procedure comprises one or more of:
continuing the presentation at the initial video quality level, and
continuing the presentation with the initial brightness of the display.

17. The machine-readable medium of claim 16, wherein the second procedure is initiated responsive to the predefined facial feature being present in the image over a specified number of consecutive intervals.

18. The machine-readable medium of claim 16, wherein the content includes an audio portion and a video portion, and wherein the first procedure comprises one or more of continuing the presentation at a reduced video quality level lower than the initial video quality level, reducing the brightness of the display, continuing the presentation with only the audio portion, and discontinuing the presentation.

19. The machine-readable medium of claim 16, wherein the first procedure comprises a plurality of reductions of resources performed in a specified sequence, and wherein the second procedure comprises a corresponding plurality of restorations of the resources performed in a reverse of the specified sequence.

20. The machine-readable medium of claim 16, wherein the second procedure is initiated at a predetermined time interval subsequent to the determination that the user is attentive to the presentation.

* * * * *